United States Patent [19]
Goichman et al.

[11] Patent Number: 5,798,487
[45] Date of Patent: Aug. 25, 1998

[54] WEIGHING DEVICE FOR ROTARY FILLING MACHINES

[75] Inventors: Tal Goichman, Bnei Brak; Leon Kalmikov, Netanya, both of Israel

[73] Assignee: Tedea Huntleigh Intl. Ltd., Herzliya, Israel

[21] Appl. No.: 588,090

[22] Filed: Jan. 18, 1996

[51] Int. Cl.⁶ .................... G01G 13/00; G01G 13/22
[52] U.S. Cl. .................... 177/83; 177/54; 177/58
[58] Field of Search .................... 177/54, 58, 83, 177/84, 229; 73/862.634, 862.639; 141/83

[56] References Cited

U.S. PATENT DOCUMENTS

| | | | |
|---|---|---|---|
| 2,603,442 | 7/1952 | Snyder et al. | 141/83 |
| 2,901,209 | 8/1959 | Bardy et al. | 141/83 |
| 3,004,231 | 10/1961 | Laimins | 141/83 |
| 3,215,173 | 11/1965 | Rutherford | 141/83 |
| 3,339,651 | 9/1967 | Garnett | 141/83 |
| 4,037,675 | 7/1977 | Storace et al. | 177/229 |
| 4,230,195 | 10/1980 | Graffin | 177/1 |
| 4,582,102 | 4/1986 | Risser | 141/95 |
| 4,616,511 | 10/1986 | Gindy et al. | 177/211 |
| 4,632,198 | 12/1986 | Uchimura | 177/211 |
| 4,690,230 | 9/1987 | Uchimura et al. | 177/229 |
| 4,838,369 | 6/1989 | Albert | 177/229 |
| 4,928,473 | 5/1990 | Nagao et al. | 177/58 |
| 5,183,125 | 2/1993 | Schurr | 177/229 |
| 5,525,762 | 6/1996 | Maaz et al. | 177/229 |
| 5,646,375 | 7/1997 | Neuman | 177/54 |

*Primary Examiner*—Cassandra C. Spyrou
*Assistant Examiner*—Randy W. Gibson
*Attorney, Agent, or Firm*—Edward Langer

[57] ABSTRACT

A weighing device dedicated for use on a rotary table of rotary machine such as a rotary fluid filling machine. The weighing device includes a load cell arranged perpendicular to a radial line emanating from the center of rotation, in tangential orientation to the direction of table rotation. Due to this orientation, deflection of the load cell beam under load will not produce errors resulting from centrifugal forces acting on the rotary machine, so that an accurate weight reading is provided.

9 Claims, 2 Drawing Sheets 5,798,487

1

WEIGHING DEVICE FOR ROTARY FILLING MACHINES

FIELD OF THE INVENTION

The present invention generally relates to the field of weighing devices. More particularly, the present invention generally relates to the field of load cells used in conjunction with rotary filling machines.

BACKGROUND OF THE INVENTION

In the last ten years there has been a tendency to use gravimetric techniques or weighing, for filling liquid in containers, rather than the conventional volumetric filling.

Many filling machines consist mainly of a rotating table which has a plurality of weighing devices and filling heads. These weighing devices and filling heads are installed on the rotating table, whereby the weighing is performed during rotation and the weighing devices are subject to rotational acceleration.

One of the most common weighing devices for the filling machine application is a load cell which is a transducer for forces or weights. The load cell is normally installed on a line radiating from the center of the rotating table. The load cell has a lower mounting area at one end, which is fixed to the rotating table, and a load mounting area at the other end. When subject to a load, the load mounting area has a downward deflection. The rotational acceleration multiplied by mass creates a centrifugal force, and this force acts on the deflected mass to create a force moment which introduces errors and interferes with the accuracy of the weighing.

The prior art includes examples of weighing equipment using load cells together with automatic filling equipment.

In U.S. Pat. No. 2,603,442 to Snyder et al, there is disclosed an apparatus for weighing and bagging materials. It, includes a rotary weighing machine which has weighing units and are moved around a table.

In U.S. Pat. No. 2,901,209 to Bardy et al, a container filling machine is disclosed, with a plurality of interrelated operations to dispense accurately measured and accurately weighed quantities of a material.

In U.S. Pat. No. 3,215,173 to Rutherford, there is disclosed a bag filling and weighing machine. It includes a rotatable hub assembly with a circular platform. A plurality of scale supporting frame members are arranged to extend radially from the platform. A fixed bag supporting means is carried by each scale so that the weight in an attached bag will activate on the scale.

U.S. Pat. No. 3,339,651 to Garnett discloses a weighing apparatus. It includes a continuously traveling weigher head and a material receptacle. The weigher head has a scale beam supporting the receptacle. There are means to operate the receptacle during a phase in the cycle of the head travel to trim off therefrom an overweight of material.

In U.S. Pat. No. 4,037,675 to Storace et al, there is disclosed a leaf spring weighing scale. The scale includes a weighing pan for receiving a load, and which is movably responsive to the load. A movable load support structure supports the weighing pan. A pair of load cells support the load support and measure its deflection. The load cells are arranged in tandem with one load cell being operative through a given portion of the weight range and the other being operative through the remaining portion of the weight range.

In U.S. Pat. No. 4,230,195 to Graffin there is disclosed an automatic control method and device for a container filling apparatus. The method includes the steps of sequentially taking containers filled in a multi-station filling machine. The weighing device at the weighing station of the transfer apparatus generates signals which are an image of the sensed weight of the successive containers sensed by the weighing device.

In U.S. Pat. No. 4,582,102 to Risser, there is disclosed a means for electronically comparing the extent of fill in containers with a preset extent. It includes a rotary filling machine which has a rotating platform with stations on which bottles are supported for filling with liquid dispensed through filling head assemblies at each individual station.

U.S. Pat. No. 4,632,198 to Uchimura discloses a multi-range load cell weighing instrument. It includes a high weighing load cell positioned adjacent a base and a low weighing load cell positioned adjacent a tray. The load cells are located such that the center lines along the length substantially coincide with the center line of the tray.

U.S. Pat. No. 4,690,230 to Uchimura discloses a multi-range load cell weighing instrument. It includes means for supporting an article to be weighed, a low range load cell and a high range load cell. The low range load cell has a high accuracy weighing range and has means for outputting a first signal in response to a weight on the supporting means. The high range load cell has a high load weighing range which is higher than the high accuracy weighing range. The high range load cell includes means for outputting a weight signal as a function of one of the first and second signals.

U.S. Pat. No. 4,928,473 to Nagao discloses a device for automatically filling and packing a predetermined weight of product in containers. It includes a rotary table which has a plurality of weighing heads radially arranged and each provided with a weigher which includes a packing container holding mechanism instead of the weight hopper.

None of these prior art patents have disclosed a weighing device which is designed and constructed for compensating dynamic forces in rotary machines, so that the weight of an object can be weighed accurately during rotation of the rotary table of the rotary machine. It is desirable to have a very efficient and also very effective design and construction of a weighing device which has the load cell oriented to provide dynamic force compensation.

SUMMARY OF THE INVENTION

Accordingly, it is a principal object of the present invention to overcome weighing accuracy problems of prior art designs, and provide a weighing device for use on a rotary table of a rotary machine such as a rotary fluid filling machine, which includes a load cell mounted in tangential orientation so that when deflected by a load, centrifugal forces do not act on the deflection to create a moment of force resulting in an error.

In accordance with a preferred embodiment of the present invention, a weighing device for determining the weight of an object while both weighing device and object are placed on a rotating table, the weighing device comprising:

at least one load cell having at least one deflectable beam and a loading point, the load cell being arranged on the rotary table such that the deflectable beam extends perpendicular to a radial line from the center of the table, in tangential orientation to the direction of table rotation; and means in the load cell supported by the deflectable beam for measuring its deflection and generating a proportional signal output, such that when the object to be weighed is placed on the loading point, centrifugal forces caused by table rotation do not act on the deflectable beam and the load cell produces output signals without errors, to provide accurate weighing.

In a preferred embodiment, the weighing device is designed with a load cell arranged perpendicular to a radial line from the table center, such that centrifugal forces resulting from table rotation do not act on the deflectable beam of the load cell, and do not introduce any errors, increasing weight accuracy.

In accordance with the present invention, load cells can be designed and mounted so as not to introduce errors due to centrifugal forces acting on rotary machines.

Further novel features and other objects of the present invention will become apparent from the following detailed description, discussion and the appended claims, taken in conjunction with the drawings.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF A PREFERRED EMBODIMENT

Figure 1:
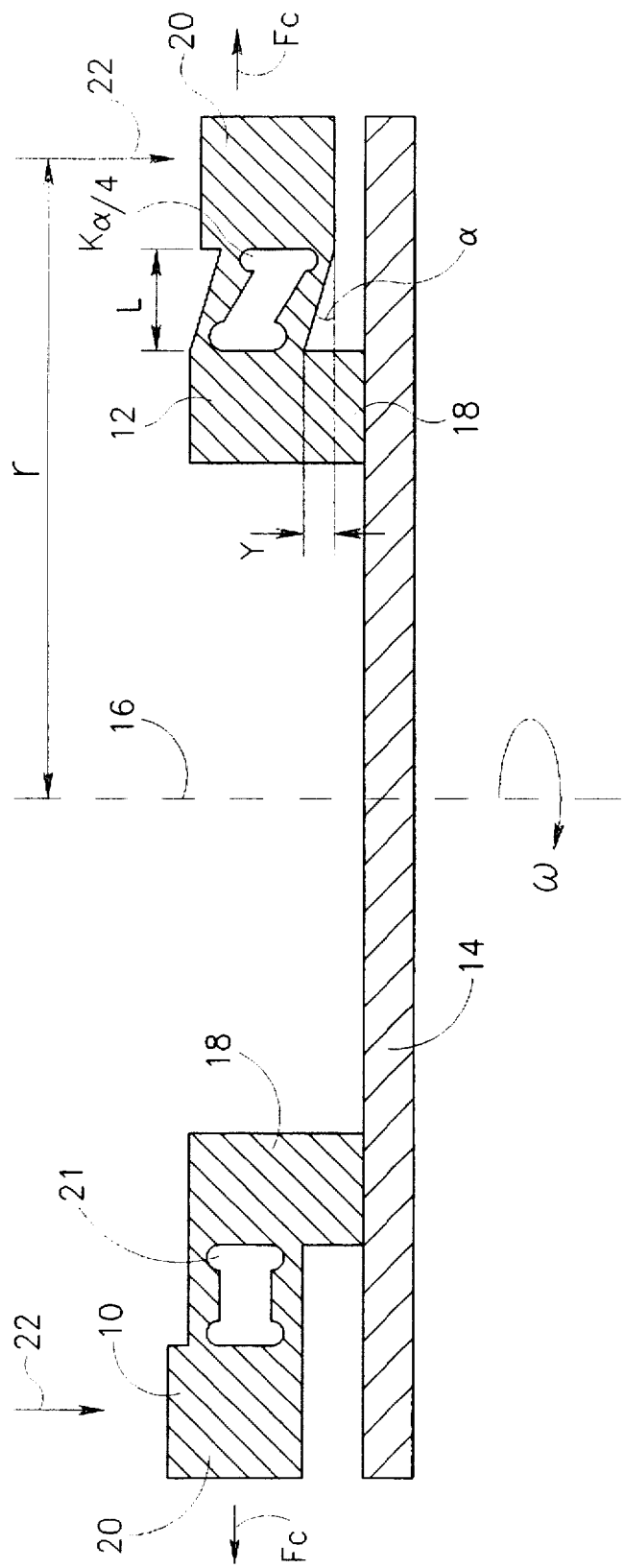
FIG. 1 is an illustrative diagram of the essential features of the prior art load cells which are mounted at opposite ends on a rotary table.

Referring to FIG. 1, there are shown prior art off-center (also referred to as single point) load cells 10 and 12 that are mounted to a rotary table 14 which rotates about a central axis 16. The off-center load cells 10 and 12 are mounted on one side 18 and loaded on a deflectable beam 20. Beam deflection is possible based on the use of flexors 21 formed in the interior opening of load cells 10 and 12, which permit downward deflection when a load is applied. When installed on the rotary table 14, the centrifugal forces Fc (shown with arrows) are acting perpendicularly to a load 22. These centrifugal forces Fc acting on the moment arm "Y" which is the deflection, create a moment having the value Fc multiplied by "Y" which in the configuration shown will act against the load and will reduce the deflection. If the load cells were mounted reversed, with deflectable beam 20 on the inside and the mounting points 18 on the outside of the rotating center 16, the moment of Fc multiplied by "Y" will tend to increase the deflection "Y".

The off-center load cell 10 illustrates an unloaded condition, and the off-center load cell 12 illustrates a loaded condition where the centrifugal forces Fc are perpendicular to the load 22. Thus, prior art load cells 10 and 12 are susceptible to the effect of the centrifugal forces on the weight readings.

The error introduced by the arrangement shown in FIG. 1 can be derived by the following analysis, based on the notation:

α=angle of deflection of deflectable beam 20
r=radius of rotation
w=angular velocity of rotation
m=total mass mounted on deflectable beam 20
W=weight of mass m Fc=centrifugal force
Fe=lifting force due to Fc, causing negative error of weight
Kα=angular spring coefficient of load cell deflectable beam 20
g=gravitational force
L=moment arm of load cell In a balanced system, equilibrium of the moments is established in the system of FIG. 1, and ΣM=0, such that:

$$Fc*Y + K\alpha*\alpha - WL = 0 \tag{1}$$

which is equivalent to:

$$mw^2 r*L*(\tan)\alpha + K\alpha*\alpha - mgL = 0 \tag{2}$$

The angle is proportional to the measured strain of the load cell 12. Thus, the measured vertical force applied to the load cell is:

$$\frac{K\alpha*\alpha}{L} = mg - mw^2 r*(\tan)\alpha \tag{3}$$

The expression $mw^2 r*(\tan)\alpha$ represents a negative centrifugal error force Fe which is proportional to $w^2$. When w=0, load cell 12 measures the real weight mg of load 22 in accordance with Eq. (3).

Figure 2:
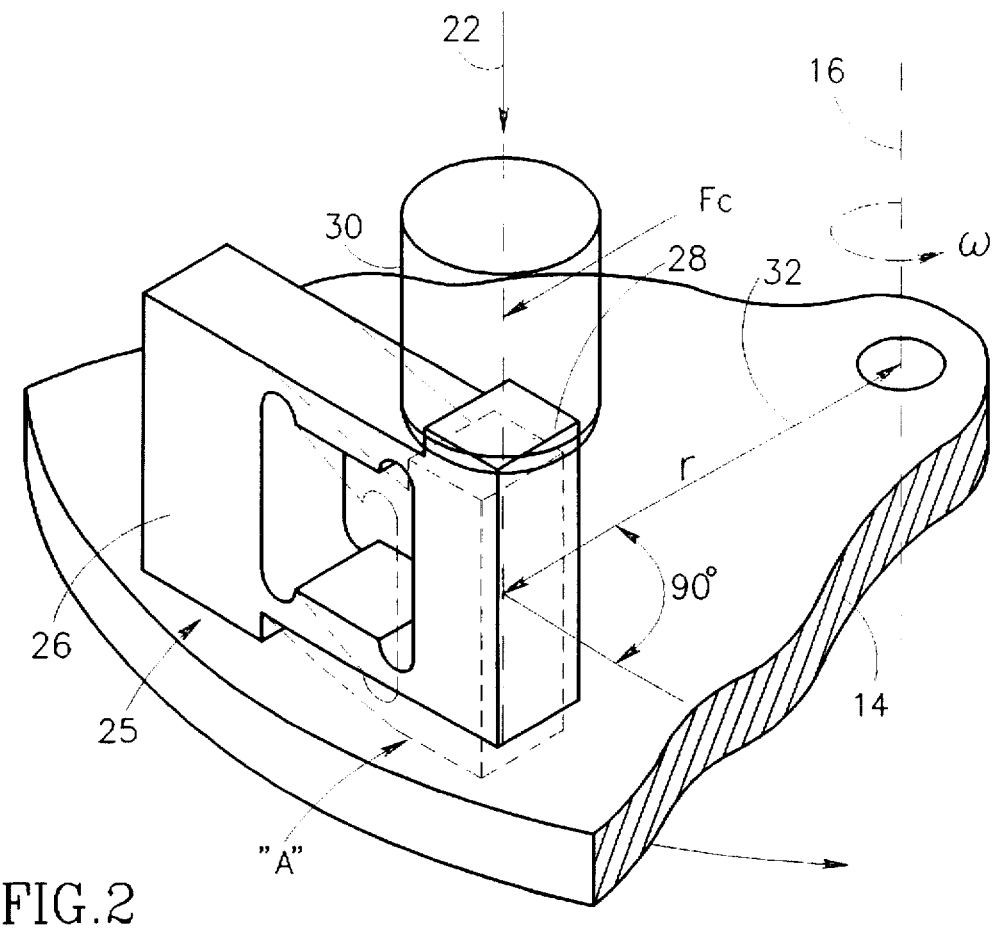
FIG. 2 is an illustrative diagram showing a preferred embodiment of the present invention, featuring a weighing device which is mounted on a rotary table of a rotary machine.

Referring now to FIG. 2, there is shown a perspective view of the preferred embodiment of weighing device 25 of the present invention which is mounted on a rotary table 14 of a rotary machine (not shown except for a portion of rotary table 14). The weighing device 25 can be incorporated with rotary machines (for example a rotary fluid filling machine) which have a rotary table 14 or disc. The table 14 may contain a multiplicity of individual stations with a weighing device 25 at each station. Each station comprises a load cell 26 which provides a loading point 28 used as a weighing platform which is integrally formed with load cell 26. A container 30 may be provided on loading point 28. All portions of each station rotate on table 14.

A rotary machine may be arranged with a filling apparatus (not shown) having a plurality of nozzles located above the rotary table 14 of the rotary machine. The filling apparatus and the rotating table 14 are adapted to rotate synchronously so that a nozzle and container 30 placed on loading point 28 are together at an operating location. The nozzle fills container 30 with fluid during rotation of the rotary table 14, and weighing device 25 reads the weight accurately because it comprises load cell 26 which is mounted perpendicular to a radial line 32, to avoid errors introduced by dynamic forces caused by machine rotation.

In the arrangement shown in FIG. 2, the centrifugal force Fc acts in a plane orthogonal to the deflection plane, thus Fc does not participate in the equation defining the equilibrium of moments, and thus ΣM=0, and Kα*α=mgL=W, so that load cell 26 measures only gravitational force, and is unaffected by centrifugal force developed by rotation of rotary table 14.

Figure 3:
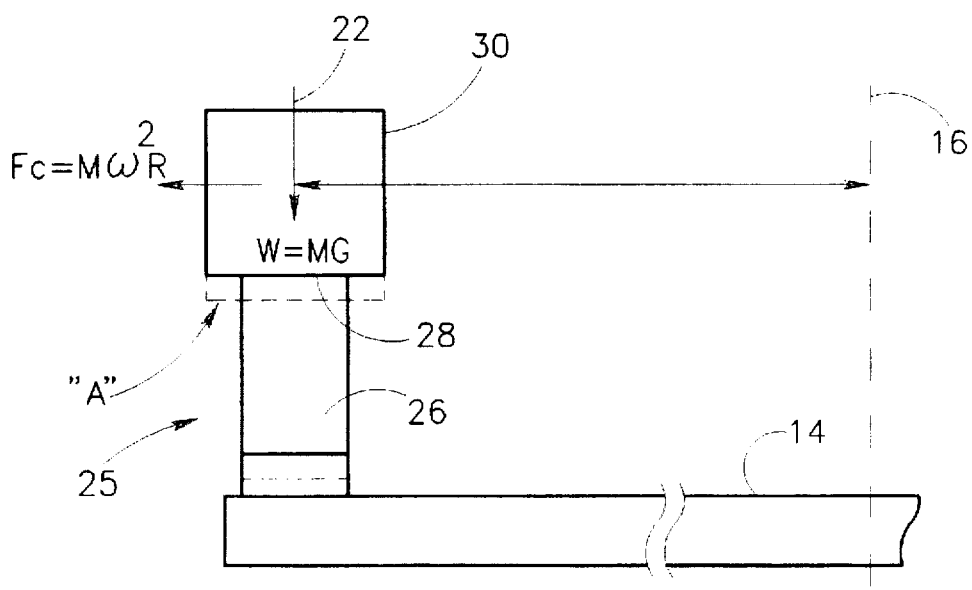
FIG. 3 is a side view of a preferred embodiment of the present invention weighing device.

FIG. 3 shows a side view of the weighing device 25 of the present invention. Referring to FIGS. 2 and 3, in weighing devices, such as the one described herein, the weight is ultimately determined by the load cell 26 which develops a voltage corresponding to the weight of the object on the loading point 28. Load cells typically contain strain gages (not shown) in the form of fine wires arranged in a pattern and cemented to a location on the load cell that will be subjected to physical strain. The fine wires will have a certain resistance when the metal to which it is cemented is not under strain.

When the metal is distorted, the attached wires, due to their elastic properties, will be stretched. This in turn, reduces the wire cross section and increases its length so that the resistance within the wires is changed. The differences in resistance are converted to changes in voltage through the use of a basic bridge circuit. This configuration is commonly used in today's high accuracy load cells, although other configurations may be utilized.

When a force or weight is placed on top of the weighing device 25 or in container 30, the force is transmitted down to the load cell 26. This arrangement causes load cell 26 to deflect (position "A"), without introducing errors due to the centrifugal forces of rotation, since load cell 26 is mounted in perpendicular to radial line 32, in tangential orientation to the direction of rotation. Thus, the voltage output of weighing device 25 is an electrical signal in which dynamic force errors are eliminated.

The weighing device 25 of the present invention can be made from several materials. By way of example, the weighing device 25 can be made of stainless steel or aluminum. The present invention conforms to conventional forms of manufacture or any other conventional way known to one skilled in the art. The present invention is easy to use, and is designed to provide a device that will be economically feasible, long lasting and relatively trouble-free in operation.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

We claim:

1. A weighing device for determining the weight of an object while both weighing device and object are placed on a rotating table, the weighing device comprising:

at least one load cell having at least one deflectable beam and a loading point, said load cell being arranged on the rotating table such that said deflectable beam extends in a plane perpendicular to a radial line from the center of the table, said beam being deflectable within said plane, said plane being in tangential orientation to the direction of table rotation; and means in said load cell supported by said deflectable beam for measuring its deflection within said plane and generating a proportional signal output, such that when the object to be weighed is placed on said loading point, centrifugal forces caused by table rotation do not act within said plane on said deflectable beam so that no moment of force is developed therein, and said load cell generates said output signal without errors associated with said centrifugal forces, to provide accurate weighing.

2. The weighing device of claim 1 wherein said load cell is constructed as an off-center load cell.

3. The weighing device of claim 1 wherein said load cell is constructed as a bending beam load cell.

4. The weighing device of claim 1 wherein said load cell is constructed as a shear beam load cell.

5. The weighing device of claim 1 wherein said load cell is fabricated of metal.

6. The weighing device of claim 1 wherein said loading point further comprises a weighing platform for holding a container.

7. The weighing device of claim 1 wherein said means for producing an output signal proportional to the weight of the object includes at least one strain gage attached to said deflectable beam.

8. A rotary machine for weighing an object comprising:

a rotating table; and a weighing device for determining the weight of the object while both said weighing device and the object are placed on said table, said weighing device comprising:

at least one load cell having at least one deflectable beam and a loading point, said load cell being arranged on said table such that said deflectable beam extends in a plane perpendicular to a radial line from the center of said table, said beam being deflectable within said plane, said plane being in tangential orientation to the direction of table rotation; and means in said load cell supported by said deflectable beam for measuring its deflection within said plane and generating a proportional signal output, such that when the object to be weighed is placed on said loading point, centrifugal forces caused by table rotation do not act within said plane on said deflectable beam so that no moment of force is developed therein, and said load cell generates said output signal without errors associated with said centrifugal forces, to provide accurate weighing.

9. A method for determining the weight of an object placed on a rotating table, said method comprising the steps of:

providing at least one load cell having at least one deflectable beam and a loading point, said load cell being arranged on the rotating table such that said deflectable beam extends in a plane perpendicular to a radial line from the center of the table, said beam being deflectable within said plane, said plane being in tangential orientation to the direction of table rotation; and placing the object on said loading point; and measuring the deflection of said deflectable beam within said plane and generating a signal output, wherein centrifugal forces caused by table rotation do not act within said plane on said deflectable beam so that no moment of force is developed therein, and said load cell generates said output signal without errors associated with said centrifugal forces, to provide accurate weighing.

* * * * *